July 23, 1935.   C. E. REED   2,009,299
EARTH BORING DRILL
Filed Oct. 10, 1934
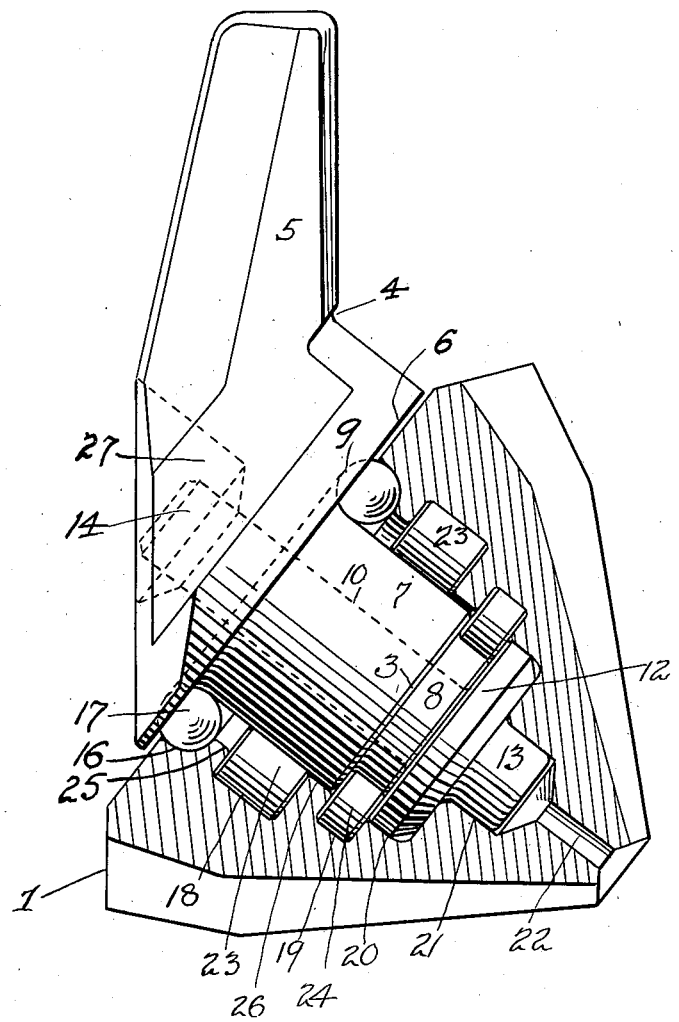
INVENTOR
Clarence E. Reed
BY
Spear, Donaldson & Hall
ATTORNEY Patented July 23, 1935

2,009,299

UNITED STATES PATENT OFFICE 2,009,299

EARTH BORING DRILL

Clarence E. Reed, Wichita, Kans.

Application October 10, 1934, Serial No. 747,786

7 Claims. (Cl. 255—71)

This invention relates to a bearing assembly for the cutters of earth boring tools and more particularly is an improved bearing for cutters of the frusto-conical type within which the bearing spindle terminates.

Cutters of this general type are subjected to operating loads of high magnitude exerted from all directions, and the spindle and bearing surfaces sustaining these loads are accordingly subject to considerable wear.

An object of the present invention is the provision and arrangement of bearing surfaces which will each be especially suited to carry cutter loads of a particular nature. In this manner a division of duty between the bearing surfaces is accomplished.

The accompanying drawing showing a preferred embodiment of the invention is an elevation partly in section of a cutter and spindle assembly.

The cutter 1 is rotatably mounted upon a two piece spindle 3 projecting from a base supporting member 4. This base member has a shank 5 for attachment in any suitable manner to a bit head and an inclined face at 6 from which the spindle perpendicularly projects. The inner part of the spindle 3 is integral with the base member and has an elongated cylindrical portion 7 and a reduced cylindrical end portion 8. At the junction of the cylindrical portion 7 and the face 6 is a recessed ball raceway 9. Through the inner spindle part and the base member 4 is a bored hole 10 concentric with the cylindrical surfaces 7 and 8.

The outer separately formed part of the spindle has a flange 12 of larger diameter than the reduced cylindrical end 8, and also has a cylindrical end 13 of reduced diameter. A stem 14 of this outer part of the spindle extends through the hole 10 to near the outer wall of the supporting member 4. It will be observed that the flange 12 forms a wall of a recessed raceway at the cylindrical portion 8 of the spindle.

The cutter 1 which may have any desired external contour is bored to provide a ball raceway 16 at its base for ball bearings 17 and a plurality of cylindrical bearing surfaces 18, 19, 20, 21 as well as an opening 22 for the insertion of a driving pin. Bearing surface 18 provides a raceway for rollers 23 which roll upon surface 7 of the spindle. Bearing surface 19 provides a recessed raceway for the retaining rollers 24 and this raceway registers with the recessed raceway on the spindle at 8. A frictional contact is had by bearing surface 20 on the outer face of flange 12, and likewise, the bearing surface 21 frictionally engages the reduced bearing surface 13. Of the internal flanges 25 and 26, the flange 25 may directly engage cylindrical surface 7 to provide an additional friction bearing.

In assembling the parts, the separately formed spindle end is first dropped into place within the cutter and then rollers 23 and 24 are placed into position within the cutter. This is easily accomplished because of the clearance space between stem 14 and the lugs 25 and 26. This subassembly may then be mounted upon the spindle part 7, 8 with the stem 14 entering the bore 10. Balls 17 may be interposed between bearing surfaces 16 and 9 at any time before the opening between the cutter and face 6 is closed. The removable spindle part may then be secured in place by welding applied at 27.

While these several bearing points all, more or less, sustain the various loads imposed upon the cutter in operation, they individually are suited to perform one function to particular advantage. Balls 17 carry end thrusts driving the cutter upon its spindle. Rollers 23 carry radial thrusts upon the cutter. Retaining rollers 24 lock the cutter in place upon the spindle so as to prevent its removal in operation. The frictional bearing engagement, especially that at the extremity 13 of the spindle, serves to maintain the axial alignment of the cutter upon its spindle and insure a surface engagement along the entire length of rollers 23 by preventing tilting of the cutter. The provision of distinct bearings best suited to sustain the several loads experienced in service results in a materially lengthened period of utility before repair is required.

While the invention has been disclosed in connection with a cutter of the frusto-conical type in which the spindle terminates within the cutter, and the invention is of particular utility with cutters of this general type, it is to be understood that it is not limited to this association.

Features relating to the construction of the spindle with its shank, not claimed herein, are included in the subject matter of my copending applications 706,989, filed January 17, 1934, and 716,879, filed March 22, 1934.

Features relating to the apex opening 22 of the cutter form subject matter of my copending application 697,973, filed November 14, 1933.

What is claimed is:

1. A cutter unit comprising a roller cutter mounted for rotation on a spindle, a spindle integral with a support, said support having a ball race therein, a roller bearing race and a friction bearing area on the spindle and also a race for anti-friction retaining means on the spindle.

2. A spindle and support for a roller cutter, said support having a raceway for anti-friction bearings and the spindle having three raceways thereon and a free end forming a friction bearing area.

3. A spindle and support for a roller cutter, said spindle having three raceways thereon, one taking end thrusts of anti-friction bearings, another taking radial loads of anti-friction bearings and the third raceway taking anti-friction retaining means, the spindle having a free end forming a friction bearing area.

4. A spindle and support for a roller cutter integral with each other, the support having a raceway which is partly also on the spindle, the spindle having another raceway for anti-friction bearing means and a raceway for anti-friction retaining means, the spindle having a removable free end, which end has a flange forming one side of the last mentioned raceway and a cylindrical bearing area.

5. A roller cutter having a raceway opening through its base side and inwardly from said raceway two other separate raceways, the raceways being separated from each other by two ribs each integral with the cutter, one of said ribs adapted to have friction bearing on a spindle within the cutter, and a reduced diameter friction bearing area inwardly of the cutter from the raceways.

6. A roller cutter unit comprising a roller cutter, a spindle therefor and supporting means, anti-friction end thrust receiving means positioned between the support and the roller cutter, anti-friction radial load carrying means positioned between the cutter and the spindle intermediate of the height of the cutter and anti-friction retaining means positioned further inwardly of the cutter, said retaining means locking the cutter rotatively on the spindle.

7. A roller cutter unit comprising a support having a spindle projecting therefrom, a roller cutter rotatably mounted on the spindle and inclosing the free end thereof, said spindle and cutter having cooperating pairs of bearing surfaces including end thrust receiving ball raceways at the base of the spindle, radial thrust receiving roller raceways intermediate of the spindle, reduced frictional contact cylindrical bearing surfaces at the extremity of the spindle, and recessed roller bearing raceways to receive retaining rollers between said radial thrust bearings and said friction bearings, and anti-friction bearings upon said raceways.

CLARENCE E. REED.